(12) United States Patent
Dolignon et al.

(10) Patent No.: US 11,741,335 B2
(45) Date of Patent: Aug. 29, 2023

(54) HOLOGRAPHIC VIRTUAL ASSISTANT

(71) Applicant: Accenture Global Solutions Limited, Dublin (IE)

(72) Inventors: Arnaud Dolignon, Schlieren (CH); Ouassim Fari, Vienna (AT); Carolyn Mulhern, Deerfield, IL (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/500,646

(22) Filed: Oct. 13, 2021

(65) Prior Publication Data

US 2022/0035445 A1 Feb. 3, 2022

Related U.S. Application Data

(63) Continuation of application No. 16/987,928, filed on Aug. 7, 2020, now Pat. No. 11,170,286, which is a continuation of application No. 16/460,096, filed on Jul. 2, 2019, now Pat. No. 10,783,428.

(60) Provisional application No. 62/694,219, filed on Jul. 5, 2018, provisional application No. 62/694,177, filed on Jul. 5, 2018.

(51) Int. Cl.
| | |
|---|---|
| *G06F 3/01* | (2006.01) |
| *G06N 3/006* | (2023.01) |
| *G06N 20/00* | (2019.01) |
| *G06F 9/451* | (2018.01) |
| *G06F 3/16* | (2006.01) |

(52) U.S. Cl.
CPC .............. *G06N 3/006* (2013.01); *G06F 3/011* (2013.01); *G06F 3/16* (2013.01); *G06F 9/453* (2018.02); *G06N 20/00* (2019.01); *G06F 3/017* (2013.01)

(58) Field of Classification Search
CPC ...................................................... G06F 3/017
See application file for complete search history.

(56) References Cited

U.S. PATENT DOCUMENTS

| | | | |
|---|---|---|---|
| 7,197,132 B2 | 3/2007 | Dezonno et al. | |
| 9,251,787 B1 * | 2/2016 | Hart | G10L 15/22 |
| 10,176,808 B1 | 1/2019 | Lovitt | |
| 10,628,635 B1 | 4/2020 | Carpenter, II et al. | |
| 10,728,635 B2 * | 7/2020 | Hoffmann | H04B 10/25753 |
| 10,783,428 B2 | 9/2020 | Dolignon et al. | |
| 10,891,947 B1 * | 1/2021 | Le Chevalier | G10L 15/22 |
| 10,943,463 B1 * | 3/2021 | Clark | G08B 21/0438 |
| 11,170,286 B2 | 11/2021 | Dolignon et al. | |

(Continued)

OTHER PUBLICATIONS

Winslow, "Holographic Projection Technologies of the Future" World Think Tank, 2007, 110 pages.

*Primary Examiner* — Di Xiao
(74) *Attorney, Agent, or Firm* — Fish & Richardson P.C.

(57) ABSTRACT

Implementations are directed to methods for providing an enhanced encounter via a holographic virtual assistant, including detecting, by one or more processors, an encounter request from a user, selecting a first encounter including a first holographic representation and a first dialog output, providing the first encounter for presentation to the user on the holographic virtual assistant, receiving, from the user, a first user reaction, the first user reaction including a first user dialog input and a first user engagement input, and training, using the first user reaction, a conversational goal model.

20 Claims, 7 Drawing Sheets

(56) References Cited

U.S. PATENT DOCUMENTS

| | | | |
|---|---|---|---|
| 2014/0317030 A1* | 10/2014 | Shen | G06N 3/006 |
| | | | 706/46 |
| 2015/0112796 A1* | 4/2015 | Greenzeiger | G06Q 30/0251 |
| | | | 705/14.49 |
| 2015/0348554 A1* | 12/2015 | Orr | G10L 17/22 |
| | | | 704/275 |
| 2017/0330215 A1* | 11/2017 | Bruno | G06Q 30/0239 |
| 2018/0018373 A1 | 1/2018 | Yazdian | |
| 2018/0052541 A1 | 2/2018 | Hoggarth et al. | |
| 2018/0229372 A1* | 8/2018 | Breazeal | B25J 11/0015 |
| 2018/0273345 A1* | 9/2018 | Rao | B66B 3/00 |
| 2018/0281196 A1* | 10/2018 | Sakai | G06V 40/20 |
| 2018/0366118 A1 | 12/2018 | Lovitt et al. | |
| 2019/0018364 A1 | 1/2019 | Kim | |
| 2019/0019507 A1* | 1/2019 | Abrahams | G06N 5/04 |
| 2019/0139541 A1* | 5/2019 | Andersen | G10L 25/48 |
| 2020/0012916 A1 | 1/2020 | Dolignon et al. | |
| 2020/0167597 A1* | 5/2020 | Nguyen | G06F 3/013 |
| 2020/0364534 A1 | 11/2020 | Dolignon et al. | |

\* cited by examiner

HOLOGRAPHIC VIRTUAL ASSISTANT

CROSS-REFERENCE TO RELATED APPLICATIONS

This application is a continuation of U.S. application Ser. No. 16/987,928, filed Aug. 7, 2020, now allowed, which is a continuation of U.S. application Ser. No. 16/460,096, filed Jul. 2, 2019, now U.S. Pat. No. 10,783,428, issued Sep. 22, 2020, which claims the benefit of U.S. Provisional Application Ser. No. 62/694,219 filed on Jul. 5, 2018, and of U.S. Provisional Application Ser. No. 62/694,177 filed on Jul. 5, 2018. The complete disclosures of all of the above patent applications are hereby incorporated by reference in their entirety for all purposes.

TECHNICAL FIELD

This specification generally relates to computer-based techniques for providing an enhanced user encounter with a holographic virtual assistant.

BACKGROUND

A virtual assistant can provide information and guidance through interactive communications with a user. Interactive communications can include a simulated human assistant, including a representation of a person, to facilitate more realistic communications between the user and the virtual assistant.

SUMMARY

This specification describes, among other things, techniques for using user-provided dialog, contextual clues, and environmental factors to provide an enhanced encounter via a holographic virtual assistant. More particularly, implementations of the present disclosure are directed to user interactions with a holographic virtual assistant to provide information and/or guidance to the user. The holographic virtual assistant can communicate with the user via dialog-based conversation as well as holographic representations (e.g., maps, faces, objects, etc.) to enhance the user's understanding of the information and/or guidance provided. User-based contextual clues and user-provided dialog can be utilized by the holographic virtual assistant to enhance the information and/or guidance provided by the virtual assistant to the user.

Virtual assistants (e.g., chatbots) can be utilized by media content/entertainment websites, messaging platforms, and customer service providers. Through dialog-based simulated conversations, a virtual assistant can provide a range of automated assistance to a user, where the virtual assistant solicits one or more inputs from the user (e.g., in the form of a question) and process the user responses to provide additional solicitations, and/or take a particular action (e.g., provide recommended content).

In general, one embodiment of the subject matter of this specification can include a method for providing an enhanced encounter via a holographic virtual assistant, the method including detecting, by one or more processors, an encounter request from a user, selecting a first encounter including a first holographic representation and a first dialog output, providing the first encounter for presentation to the user on the holographic virtual assistant, receiving, from the user, a first user reaction, the first user reaction including a first user dialog input and a first user engagement input, and training, using the first user reaction, a conversational goal model. Other embodiments of this aspect include corresponding systems, apparatus, and computer programs, configured to perform the actions of the methods, encoded on computer storage devices.

These and other embodiments may include one or more of the following features.

In some implementations, the method further includes selecting, based on the first user reaction and using the conversation goal model, a second encounter including a second holographic representation and a second dialog output and providing, the second encounter for presentation to the user on the holographic virtual assistant.

In some implementations, the encounter request and the first user reaction include one or more contextual clues, e.g., non-verbal cues. A non-verbal cue can be one of i) a gesture, ii) a mood expression, iii) user demographic data.

In some implementations, the conversational goal model includes a human model for the user. In some implementations, the holographic virtual assistant is provided for presentation on a virtual assistant kiosk.

In some implementations, the method further includes detecting, in an encounter area encompassing the virtual assistant kiosk, the encounter area including the user, an object, determining, based on the object in the encounter area, a conversational goal, and providing, to the conversational goal model, the conversation goal based on the object detected in the encounter area.

In general, another embodiment of the subject matter of this specification can includes a system including one or more sensors, a holographic projector, one or more processors, and a computer-readable storage device coupled to the one or more processors and having instructions stored thereon which, when executed by the one or more processors, cause the one or more processors to perform operations for providing an enhanced encounter via a holographic virtual assistant, including detecting an encounter request from a user, selecting a first encounter including a first holographic representation and a first dialog output, providing the first encounter for presentation to the user on the holographic virtual assistant, receiving, from the user, a first user reaction, the first user reaction including a first user dialog input and a first user engagement input, and training, using the first user reaction, a conversational goal model.

In general, another embodiment of the subject matter described in this specification can includes a method for providing an enhanced encounter via a holographic virtual assistant, the method being executed by one or more processors and including detecting, by the one or more processors, an encounter request from a user, determining an environmental factor for the holographic virtual assistant, selecting, based on the environmental factor, a first encounter, the first encounter including a first holographic representation and a first dialog output, and providing the first encounter for presentation to the user on a holographic virtual assistant, receiving, from the user, a first user reaction, the first user reaction including a first user dialog input and a first user engagement input, determining, based on the first user reaction and the environmental factor, a second encounter, the second encounter including a second holographic representation and a second dialog output, and providing the second encounter for presentation to the user on the holographic virtual assistant. Other embodiments of this aspect include corresponding systems, apparatus, and computer programs, configured to perform the actions of the methods, encoded on computer storage devices.

These and other embodiments may include one or more of the following features. In some implementations, the environmental factor is based in part on a location of the virtual assistant kiosk. The environmental factor can be based in part on a position of the user in relation to the virtual assistant kiosk.

In some implementations, the first holographic representation includes location information based on the environmental factor.

In general, another embodiment of the subject matter of this specification can includes a system including one or more sensors, a holographic projector, one or more processors, and a computer-readable storage device coupled to the one or more processors and having instructions stored thereon which, when executed by the one or more processors, cause the one or more processors to perform operations for providing an enhanced encounter via a holographic virtual assistant, including detecting an encounter request from a user, determining an environmental factor for the holographic virtual assistant, selecting, based on the environmental factor, a first encounter, the first encounter including a first holographic representation and a first dialog output, and providing the first encounter for presentation to the user on a holographic virtual assistant, receiving, from the user, a first user reaction, the first user reaction including a first user dialog input and a first user engagement input, determining, based on the first user reaction and the environmental factor, a second encounter, the second encounter including a second holographic representation and a second dialog output, and providing the second encounter for presentation to the user on the holographic virtual assistant.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Some implementations of the subject matter described herein can, in certain instances, achieve one or more of the following advantages. Contextual clues (e.g., verbal clues, non-verbal clues, user location, user demographics, etc.) from a user and the user's surroundings can be utilized to inform the encounters between the user and the holographic virtual assistant system. Dynamic encounters including dialog processes and holographic representations can be generated one or more interaction models, where the interaction models are trained using neural networks using conversational metrics. Conversational metrics including user mood, satisfaction with the conversation, etc. can be used to measure and assess conversational goals and the dynamic encounters can be adjusted accordingly.

The holographic virtual assistant system can account for the environmental factors such as location and context in which the user is interacting with the holographic virtual assistant system to provide information/guidance that is relevant to a current situation of the user. The holographic virtual assistant system may interpret a conversational goal contextually, e.g., to the user's surroundings, in order to provide more effective information/guidance to the user. For example, the holographic virtual assistant system can detect a use gesture in relation to the user's environment and respond accordingly, improving the effectiveness of the exchange between the user and the holographic virtual assistant system.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed towards techniques for using user-provided dialog, contextual clues, and environmental factors to provide an enhanced encounter via a holographic virtual assistant. More particularly, implementations of the present disclosure are directed to user interactions with a holographic virtual assistant to provide information and/or guidance to the user. The holographic virtual assistant can communicate with the user via dialog-based conversation as well as holographic representations, e.g., maps, faces, objects, etc., to enhance the user's understanding of the information and/or guidance provided.

Figure 1A:
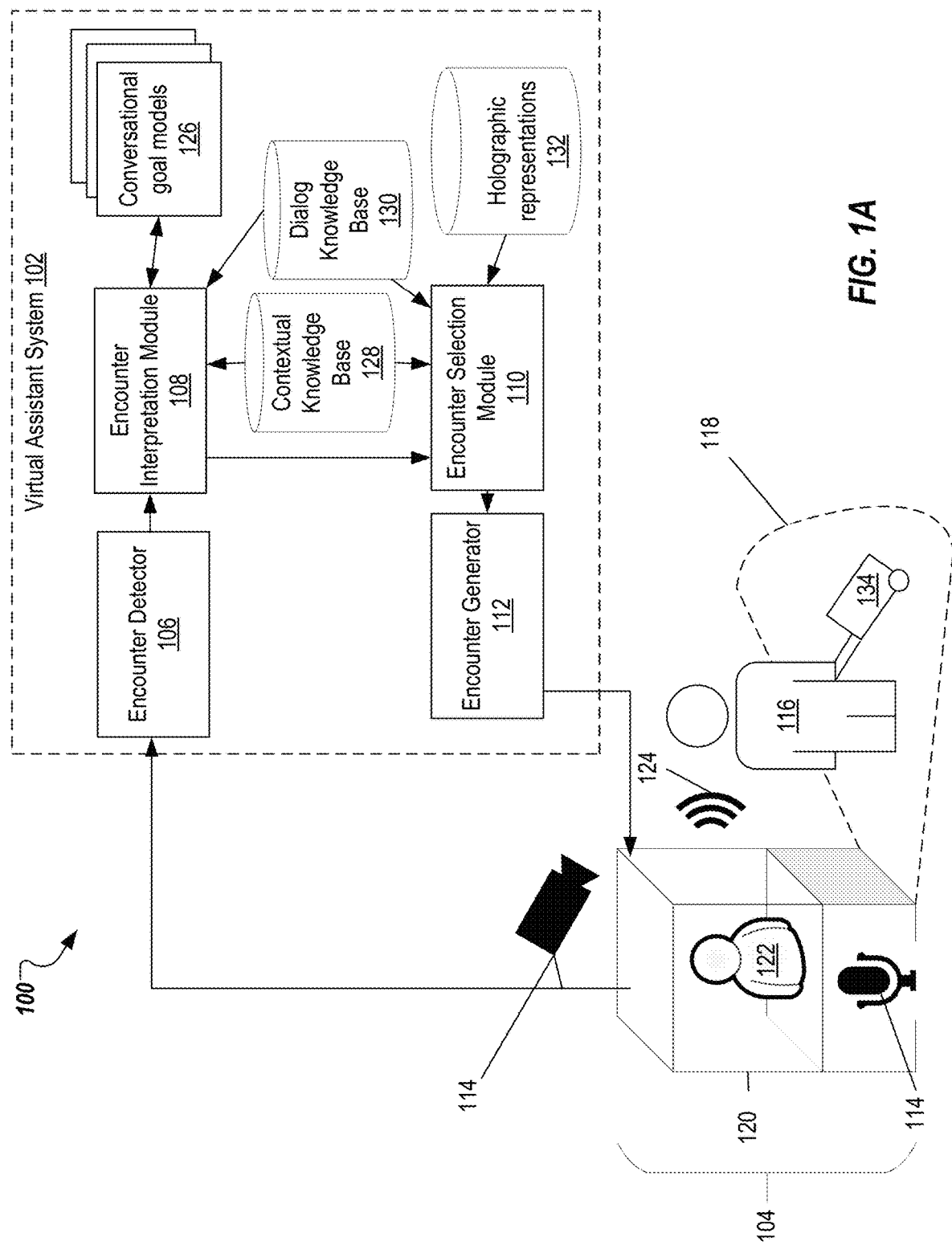
FIGS. 1A and 1B depict example operating environment for a virtual assistant system.

FIG. 1A depicts example operating environment 100 for a holographic virtual assistant system 102 including a virtual assistant kiosk 104. The holographic virtual assistant system 102 may be implemented on one or more different servers in communication directly or over a computer network, including an encounter detector 106, and encounter interpretation module 108, an encounter selection module 110, and an encounter generator 112, the operations of which are described in more detail below with reference to FIG. 2. A computer network can be a local area network (LAN), the Internet, or a combination thereof, connecting a server computer to the virtual assistant kiosk 104. The holographic virtual assistant system 102 can be implemented on a local server that is included as a part of the virtual assistant kiosk 104.

The virtual assistant kiosk 104 can include one or more sensors 114 including one or more video cameras, audio recording devices, e.g., microphones, motion detectors, IR sensors, WiFi/Bluetooth receivers, three-dimensional depth sensors, e.g., LIDAR, or the like. The one or more sensors 114 can be used by the holographic virtual assistant system 102 to interact with a user 116. One or more of the sensors 114 can be used to detect a presence of a user 116 in the proximity, e.g., within an encounter area 118, of the virtual assistant kiosk 104 and the holographic virtual assistant system 102 can determine that the user 116 is requesting an encounter with the virtual assistant kiosk 104.

In some implementations, the encounter area 118 includes a perimeter encompassing the virtual assistant kiosk 104. The encounter area 118 can be a geometric shape extending around, e.g., defining a perimeter surrounding, the virtual assistant kiosk 104. For example, the encounter area is a radius extending 5 feet around the virtual assistant kiosk 104. In another example, the virtual assistant kiosk 104 is located with a portion of the kiosk next to a barrier, e.g., against a wall, such that the encounter area 118 includes a region that is around a part of the virtual assistant kiosk 104.

The virtual assistant kiosk 104 includes one or more of a holographic projector 120 for displaying a holographic representation 122 and audio playback devices 124, e.g., speakers, for providing audio output to the user 116. A holographic representation 122 can include, for example, a human face/head avatar, a map, an object, e.g., a clothing item, a food item, a book, a furniture item. The holographic representation 122 can be animated to interact with the user 116. In one example, a holographic representation of a human face/head avatar can be animated to appear to be conversing with the user 116. In another example, a holographic representation 122 of a map can be animated to indicate location information, e.g., give directions, indicate a location of interest.

In some implementations, the virtual assistant kiosk 104 can include other devices or methods to facilitate user-input, for example, a keyboard, a payment processing device such as a credit card reader, an optical scanner such as an OCR reader or a barcode reader, or a graphical user interface (GUI). A virtual assistant kiosk 104 that is located in a supermarket can include a barcode scanner for reading tags on products or coupons provided by the user to locate products, or to make recommendations of other products. In one example, the user scans a packaged steak and the virtual assistant system 102 can recommend a bottle of wine to pair with the steak. In another example, the virtual assistant system 102 can help the user find the product referenced by a coupon.

The virtual assistant system 102 can include multiple different conversational goal models 126. Each conversational goal model 126 can define a conversational goal that the holographic virtual assistant system 102 determines to accomplish through an encounter with user 116. A conversational goal is a desired outcome for the encounter between the holographic virtual assistant system 102 and the user 116. Conversational goals can include providing a user with help to purchase an item, directions to a location, suggested activities, generic information, or the like. Conversational goals can also be to make a user 116 smile, laugh, or express another emotion. The conversational goal models 126 can be trained through encounters between the virtual assistant system 102 and user 116, where neural networks and/or machine learning, e.g., reinforcement learning, can be used to refine the conversational goal models 126. The conversational goal models 126 can include one or more of a human model and/or an object model, where the human/object models can be used to identify users and objects in the encounter area 118. For example, a user can be a tourist, a frequent airline flyer, and/or a shopper of athletic gear, and an object can be a shoe, bag, suitcase, headphones, and/or cane.

Figure 1B:
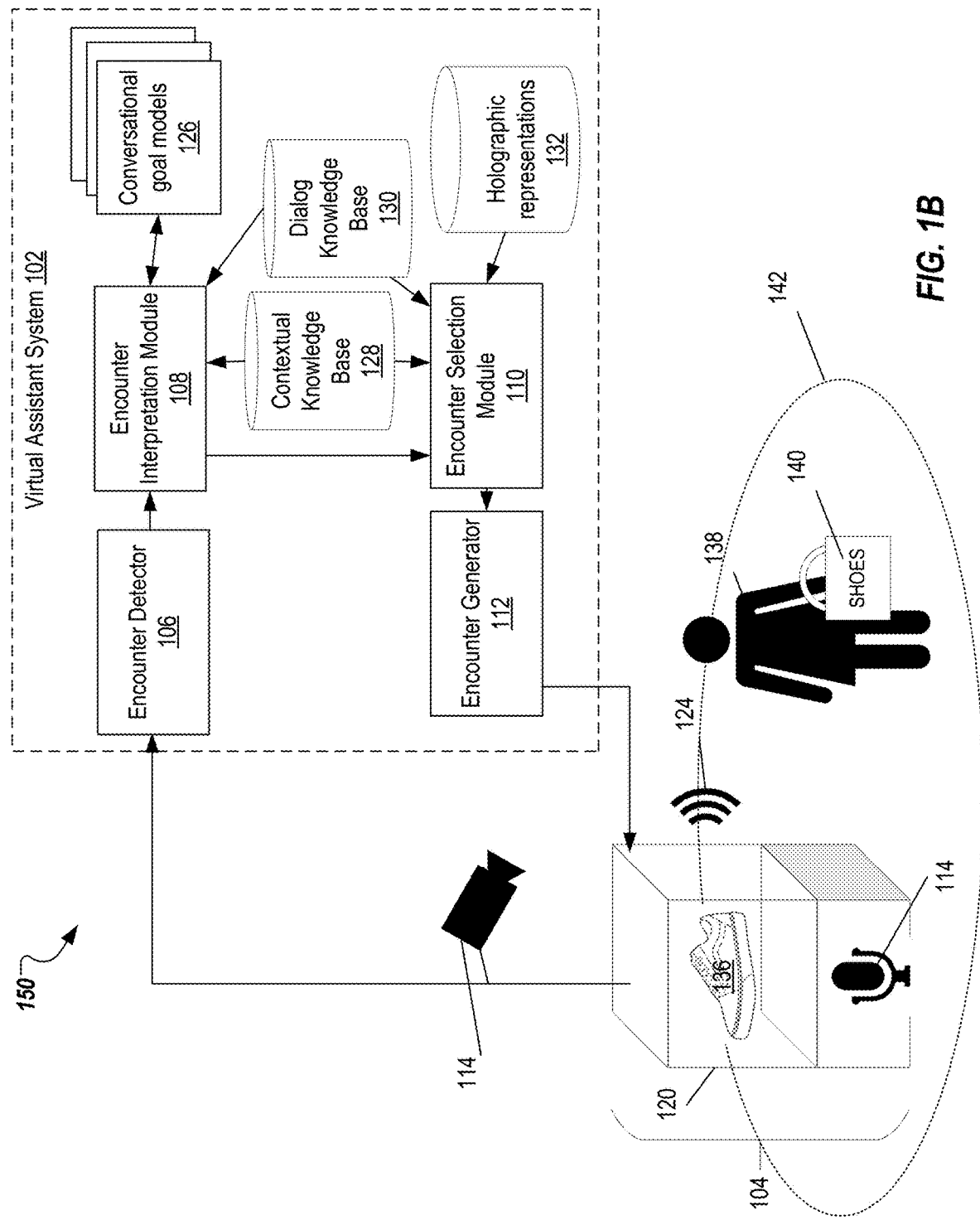

In some implementations, a conversational goal model 126 can include user demographics, e.g., age, gender, physical appearance, etc. For example, as depicted in FIG. 1A, a conversational goal model 126 can include a conversational goal of assisting a user 116 to find the closest food court in an airport, and may use one or more user demographics, e.g., age of the user 116, to provide information of airport bars. In another example, as depicted in FIG. 1B, a conversational goal model 126 can include a conversational goal of assisting a user 138 in purchasing a pair of women's shoes, and may use one or more user demographics to make suggestions of what shoes might be of interest to the user 138. User demographics in this example can be gender and age of the user 138, and the intent of the user 138 can be to find out which shoes may be on sale at the particular store.

In some implementations, the conversational goal model 126 includes one or more objects 134 within the encounter area 118. For example, as depicted in FIG. 1A, a conversational goal model 126 can include an object 134 that is a piece of luggage where the piece of luggage 134 can inform the conversational goal, e.g., "where is ticketing?" or "where is a baggage drop for my airline?". In another example, as depicted in FIG. 1B, a conversational goal model 126 can include an object 140 that is a shopping bag where a feature of the object 134 can be used by the conversational model to inform the conversational goal, e.g., "where can I return the shoes I purchased?" or "where can I buy a pair of athletic shorts?".

The virtual assistant system 102 can select a particular conversational goal model 126 for an encounter with a user 116 depending on contextual clues detected by the encounter interpretation module 108. Contextual clues can be verbal cues, non-verbal cues, and/or environmental factors.

The virtual assistant system 102 includes one or more databases, including a contextual knowledge base 128, a dialog knowledge base 130, and a holographic representation database 134. One or more of the databases for the virtual assistant system 102 can be stored locally, e.g., in a local server that is part of the virtual assistant kiosk 104, and/or stored in a cloud-based server. Though depicted in FIG. 1 as three distinct databases, the data contained in each of the contextual knowledge base 128, the dialog knowledge base 130, and the holographic representation database 134 are interrelated and may be stored as part of fewer than the listed databases.

The contextual knowledge base 128 includes data relating to contextual clues used by the encounter interpretation module 108 to determine one or more contextual clues from environmental factors and/or the user 116 during an encounter. For example, the contextual knowledge base 128 can include data relating to user gestures, mood expression, user demographics, and the like. Contextual clues can include one or more environmental factors, where an environmental factor describes the environment surrounding the virtual assistant kiosk 104, the user 116, and the encounter area 118.

In some implementations, the contextual clues include an object 134 that is identified by the encounter detector with the user 116, e.g., inside the encounter area 118. For example, an object can be a backpack, a store brand shopping bag, a suitcase, a pet, a stroller, or the like. The user may be, for example, holding or wearing the object 134. In the example depicted in FIG. 1A, the object 134 is a suitcase that the user 116 is detected to be holding while the user 116 is within the encounter area 118.

In some implementations, the contextual clues include environmental factors. Environmental factors can be, for example, bright vs. dark lighting schemes, day vs. night, loud vs. quiet ambient sounds, a number of users surrounding the user 116 that is interacting with the kiosk, ambient conditions and/or weather surrounding the kiosk, and the like. For example, if the virtual assistant system 102 detects using image data from one or more cameras that there is a line of users waiting to interact with the kiosk, it may select a more brief dialog interaction with the user 116. In another example, if the virtual assistant system 102 detects a loud ambient background it may rely on more non-verbal methods for providing information rather than audible dialog, e.g., more holographic information instead of verbal dialog.

The dialog knowledge base 130 stores a set of dynamically selectable dialog and/or natural language dialog by the encounter interpretation module 108. The dialog knowledge base 130 includes text strings that can be combined by the encounter selection module 110 to construct dynamically selectable dialog. The dynamically selectable dialog can be customized based, for example, on a user reaction, e.g., the user input dialog, and/or on one or more contextual clues and/or environmental factors. Dynamically selectable dialog can be customized, for example, in tone, pitch, dialog style, language, emotion based on one or more of the contextual clues. For example, dialog output selected for presentation to a child may be simplified in content by using smaller words and tone by using a lilting tone appealing to children. In another example, dialog output selected for presentation to an adult businessman may include a large vocabulary and sterner tone. The dynamically selectable dialog can be trained using unsupervised learning, e.g., by neural networks and/or machine learning, using feedback from one or more users interacting with the virtual assistant system 102. In another example, one or more of user reactions, contextual clues, and environmental factors detected responsive to dialog provided by the virtual assistant system 102 to achieve a particular goal can refine dialog provided to a user with a same particular goal in future encounters. In one example, reinforcement learning can be used to develop the dynamically selectable dialog. In another example, sequence to sequence deep neural networks can be used for training the dynamically selectable dialog. In yet another example, genetic evolution algorithms for self-learning and enhancement can be used to train the encounter interpretation module for selecting the dynamically selectable dialog.

The holographic representations database 132 includes a set of holographic representations that are selectable by the encounter selection module 110 to be displayed by the holographic projector 120 in the virtual assistant kiosk 104. The set of holographic representations 122 stored in the holographic representations database 132 can depend, for example, on a location of the virtual assistant kiosk 104, e.g., airport, shopping mall, amusement park, and/or an application of the virtual assistant kiosk 104, e.g., assist with direction, assist with shopping. For example, a virtual assistant kiosk 104 located in an airport may have a set of holographic representations stored in a holographic representations database 132 that include a face/head human avatar hologram for conversing with a user 116 and a holographic three-dimensional map of the airport terminal for providing directions to the user 116 on the virtual assistant kiosk 104. In another example, a virtual assistant kiosk 104 located in a shoe store may have a set of holographic representations 122 stored in a holographic representations database 132 that include one or more of the shoes to display that can be used to assist a user 116 in finding a particular product sold in the store.

In some implementations, appearance including one or more physical attributes of a holographic representation 122 can be modified based in part on the contextual clues. For example, a head/face avatar holographic representation can be customized, e.g., altered in appearance, based on the user demographics of the user 116. A face/head avatar can be presented at different ages, genders, or the like depending on the demographics of the user 116.

In the example of FIG. 1A, the virtual assistant kiosk 104 is presenting a human head/torso holographic representation 122 to provide gate information in an airport, where the human head/torso holographic representation 122 was selected by the encounter selection module 110 from a holographic representation database 132 for presentation by the virtual assistant kiosk 104. Further details relating to the selection of a particular holographic representation is discussed below with reference to FIG. 2.

FIG. 1B depicts another example operating environment 150 for a virtual assistant system 102. In the example of FIG. 1B, the virtual assistant kiosk 104 is presenting a shoe holographic representation 136 to provide product information in a store, where the shoe holographic representation 136 was selected by the encounter selection module 110 from a holographic representation database 132 for presentation by the virtual assistant kiosk 104. The user 138 is detected by the encounter detector 106 as having a shopping bag 140 within the encounter area 142.

Figure 2:
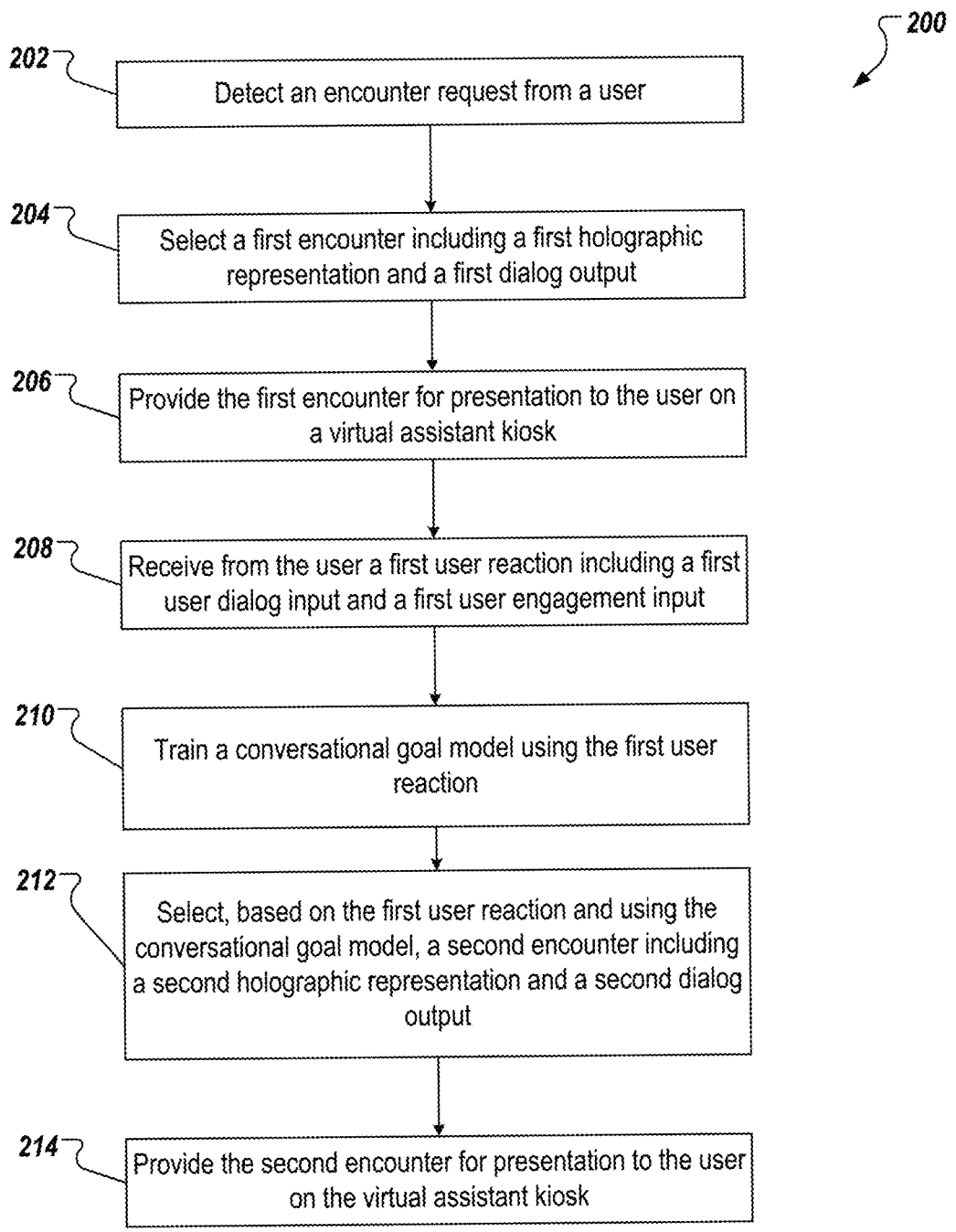
FIG. 2 is a flow diagram of an example process for operation of a virtual assistant system.

FIG. 2 is a flow diagram of an example process 200 for operation of a virtual assistant system. An encounter request is detected from a user (202). In the example operating environment 100 of the virtual assistant system 102 depicted in FIG. 1A, a user 116 with a suitcase 134 enters the encounter area 118. An encounter request, e.g., the user 116 and the user's suitcase 134 enter into the encounter area 118, can be detected by the encounter detector 106 using data collected from sensors 114 using, for example, image data from a video camera. The encounter request is an initiation of a dialog process between the user 116 and the virtual assistant system 102. The encounter request, for example, can be a user 116 entering into the encounter area 118. The encounter request can be a user-provided input to the virtual assistant system 102 via the virtual assistant kiosk 104, for example, a user greeting the virtual assistant kiosk, e.g., "Hello," making a statement, e.g., "I need help," or asking a question, e.g., "Where is the nearest coffee shop?"

An encounter interpretation module 108 receives the encounter request from the user 116 and can determine a conversational goal from the contextual knowledge base 128 for the virtual assistant system 102. A conversational goal is a goal that the user has when initiating an encounter with the virtual assistant system 102. For example, a conversational goal can be to receive general information, e.g., directions, descriptions of products, or receive recommendations, e.g., suggested purchase options, sight-seeing suggestions.

A conversational goal can be determined, in part, by natural language processing of the user-provided input. The user-provided input may be compared to the dialog knowledge base 130 to determine the user intent.

The conversational goal can be determined based in part on one or more contextual clues from the contextual knowledge base 128. Contextual clues can include user demographics, location of the virtual assistant kiosk 104 relative to its surroundings, an object 134 in the encounter area 118, or the like. For example, contextual clues for a user 116 can be "male", "middle-aged", "business casual clothing", "a suitcase", and "in an airport terminal", where the conversational goal may be "assist user to find a nearby sports bar in the terminal" or "assist user to find Delta Admiral's club." In another example, contextual clues for a user 116 can be "female," "young adult," "trendy clothing," "a shopping bag," and "in the shopping mall," where the conversational goal may be "help user 116 to find running shoes" or "give user 116 directions to the nearest coffee shop."

Based in part on the conversational goal, a conversational goal model 126 can be selected for the encounter between the virtual assistant system 102 and the user 116. In some implementations, the conversational goal model 126 can be selected based on one or more user demographics, objects 134 in the encounter area 118, or a combination thereof. For example, a conversational goal model 126 can be selected where the conversational goal is finding a nearby location to eat in an airport for a male user 116 who is above legal age, e.g., an airport pub.

A first encounter is selected including a first holographic representation and a first dialog output (204). The encounter selection module 110 can select the first holographic representation from the holographic representation database 132 and can select the first dialog output from the dialog knowledge base 130.

In some implementations, the selection of the first holographic representation depends on the selected first dialog output and vice versa. For example, the first holographic representation can be a human head/face avatar that is animated such that it appears to speak the first dialog output. The first encounter can be, for example, a greeting from the virtual assistant system 102 to the user 116 where the virtual assistant system 102 presents a human face/head holographic representation 122 in the virtual assistant kiosk 104 such that the holographic representation 122 appears to speak the first dialog output, e.g., "Hello, how can I help you today?"

In some implementations, the first encounter can be selected in part based on the determined conversational goal. For example, if a conversational goal is determined to be seeking directions, the first encounter can be initiated with a holographic representation 122 of a map and/or one or more gestures that provide directional information.

In some implementations, the first encounter can be selected in part based on a conversational goal model 126 that is selected for the encounter between the virtual assistant system 102 and the user 116. The conversational goal model 126 can be selected based on a conversational goal determined by the encounter interpretation module 108 and based on one or more contextual clues. The conversational goal model 126 may include one or more conversational goals, e.g., "get directions," "purchase a product," "learn more about an event," "get a recommendation for a place to eat." For example, for a conversational goal model 126 where the conversational goal is "get information about my flight," the first encounter can include a holographic representation 122 of a human face/head that is animated to speak the first dialog output that includes gate information, departure times, flight delays, etc.

The first encounter is provided for presentation to the user 116 on the virtual assistant kiosk 104 (206). Presentation of the first encounter can be a relaying of a piece of information to the user 116, querying the user 116 for input, e.g., asking a question, or a combination thereof. The presentation of the first encounter is displayed for viewing by the user 116 in the virtual assistant kiosk 104 and can include an animation of the first holographic representation 122. For example, the animation can be a human head/face holographic representation 122 speaking the first dialog output. In another example, the animation can be a map holographic representation 122 where a route to a location of interest is indicated.

A first user reaction from the user 116 is received, where the first user reaction includes a first user dialog input and a first user engagement input (208). The first user reaction can be determined from data collected by the one or more sensors 114. The first user reaction including data collected from one or more sensors can be aggregated and used as input to a neural network. The neural network can receive input data or one or more types, e.g., image, audio, etc., and determine a next action, e.g., a next dynamically selected dialog output, a next holographic image, to provide to the user 116 by the virtual assistant system 102.

A user dialog input is a verbal communication by the user 116 to the virtual assistant system 102. The user dialog input can be a verbal communication responsive to the first dialog output from the virtual assistant system 102 or unprompted. The user dialog input can be received by the virtual assistant system 102 and processed using natural language processing by the encounter interpretation module 108.

A user engagement input is a non-verbal communication by the user 116 to the virtual assistant system 102, where the user 116 is relaying information to the virtual assistant system 102. Forms of non-verbal communication can include, but are not limited to, gestures, user position relative to the virtual assistant kiosk 104, attentiveness, mood, or the like. Non-verbal communication can be determined from data collected by the sensors 114 and processed, for example, using machine-learning and/or software analytics to perform facial recognition, gesture recognition, and/or mood recognition.

The user engagement input is responsive to the first encounter. For example, a user who is not interested in the provided first encounter may back away from the virtual assistant kiosk 104, shift eye gaze away from the virtual assistant kiosk 104, cross their arms, or otherwise show disinterest. In another example, a user who is interested in the provided first encounter may step forward to approach the virtual assistant kiosk 104, look intently at the virtual assistant kiosk 104, wave or gesture positively at the virtual assistant kiosk, or otherwise show interest.

A conversational goal model is trained using the first user reaction (210). The conversational goal model 126 can be trained using positive feedback from the first user engagement input from user 116, e.g., to reinforce the conversational goal model, negative feedback from the first user engagement input from the user 116, e.g., to retrain the conversational goal model, or a combination thereof. For example, a conversational goal model 126 can include a conversational goal "buy shoes" for a female user 138 that is dressed in business casual clothing. The conversational goal model 126 of the encounter may determine that the virtual assistant system 102 should recommend a pair of high heels to the user 138. The first user reaction can include the user 138 providing negative feedback, e.g., "no I don't wear heels," or positive feedback, e.g., "I love those shoes!", which can cause the conversational goal model to retrain or reinforce.

In some implementations, a personalized conversational goal model 126 can be trained for a particular user 116. The conversational goal model 126 can include details that are specific to the particular user 116, e.g., purchase history, likes/dislikes, frequent information requests, etc. The personalized conversational goal model 126 can be stored locally at a virtual assistant kiosk 104 or on a cloud-based server accessible, for example, by multiple different virtual assistant kiosks 104. In one example, multiple virtual assistant kiosks 104 are deployed around a shopping center, where each virtual assistant kiosk 104 can access a personalized conversational goal model 126 for a particular user 116. When one of the virtual assistant kiosks 104 detects an encounter request from the particular user 116, it can access the personalized conversational goal model 126 for the particular user 116. The particular user 116 may desire to make multiple purchases and visit the food court around the shopping center, such that the personalized conversational goal model 126 can include learned preferences, previous purchases, conversational details for which the personalized conversational goal model has been trained through encounters with the particular user 116.

In some implementations, a conversational goal model 126 includes a human model, an object model, or a human model and an object model. A human model can include gestures, demographic information, mood expression, or other characteristics. An object model can include physical characteristics, e.g., color, size, movement, expected orientation, e.g., a backpack is worn on a user's back, a suitcase is rolled around next to a user, or other features of the object defined by the object model. The human model and object model can assist the virtual assistant system 102 to determine a conversational goal for the user. For example, an object model for an object 140 can be applied to a user 138 such that the virtual assistant system 102 identifies the object as a shopping bag and determines that the user 138 is engaged in the act of shopping for items. In another example, a human model for a child can be applied to a user 116 such that the virtual assistant system 102 identifies the user 116 as a child and selects a first encounter accordingly, e.g., uses simpler dialog output, makes child-appropriate recommendations.

Based on the first user reaction and using the conversational goal model 126, a second encounter is selected, where the second encounter includes a second holographic representation and a second dialog output (212). The second encounter can be selected, in part, based on the first user reaction. For example, the second encounter can answer a question made by the user 116 in the first user reaction and provide additional information in response to a request for more information.

In some implementations, the second holographic representation 122 can be of a same type as the first holographic representation 122 but is animated to provide a different dialog in the second dialog output. For example, a face/head holographic representation can be the first and second holographic representation 122, where the face/head holographic representation 122 is animated to provide a first dialog output in a first encounter and is animated to provide a second dialog output in a second encounter.

In some implementations, the second holographic representation 122 can be a different type of holographic representation 122, where the different holographic representation 122 is selected based on, for example, a user 116 requesting directions. For example, a face/head holographic representation can be the first holographic representation, where the face/head holographic representation is animated to provide a first dialog output, e.g., "What are you looking for today?" in a first encounter and a map holographic representation can be the second holographic representation, where the map indicates a particular location while an audible dialog is provided, e.g., "The bathrooms are to your left."

The second encounter is provided for presentation to the user 116 on the virtual assistant kiosk 104 (214). Presentation of the second encounter can be a relaying of a piece of information to the user 116, querying the user 116 for input, or the like. The presentation of the second encounter is displayed for viewing by the user 116 in the virtual assistant kiosk 104 and can include an animation of the second holographic representation 122. For example, the animation can be a human head/face holographic representation 122 speaking the second dialog output. In another example, the animation can be a map holographic representation 122 where a route to a location of interest is indicated. In yet another example, the animation can be a 360° view of a shoe product that is being presented to the user 116 for purchase.

Figure 3:
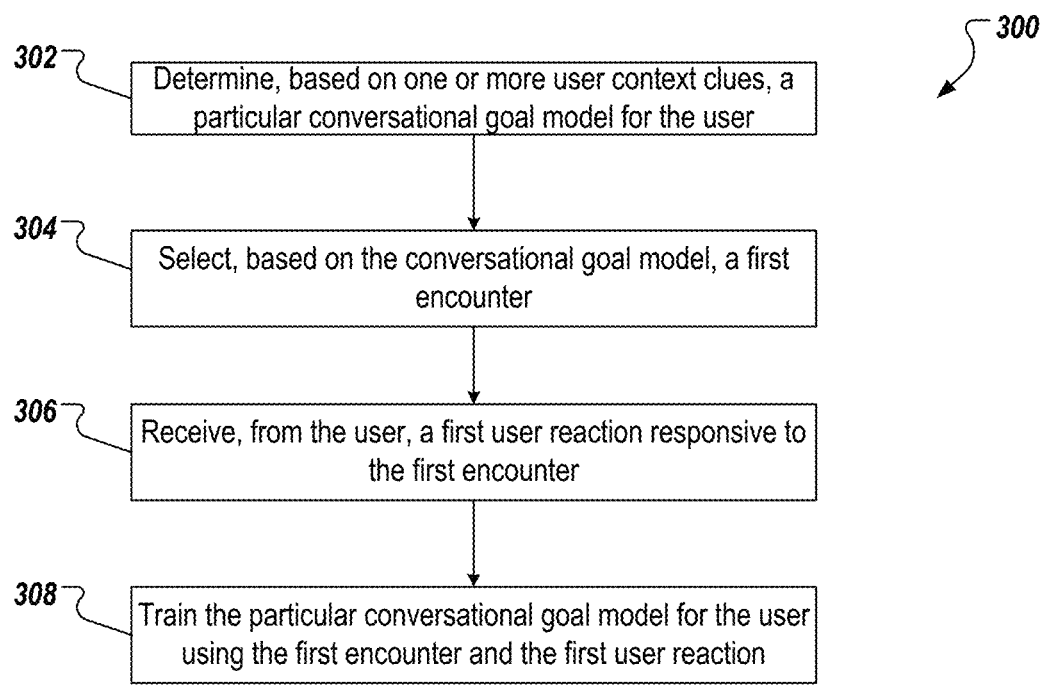
FIG. 3 is a flow diagram of another example process for operation of the virtual assistant system.

FIG. 3 is a flow diagram of another example process 300 for operation of the virtual assistant system 102. Contextual clues for an encounter between the virtual assistant system 102 and a user 116 can include, for example, verbal clues, non-verbal clues, user location, etc. The contextual clues can be included in the encounter request, in the first user reaction responsive to the first encounter, or a combination thereof. For example, an encounter between the virtual assistant system 102 and a user 116 in an international terminal of an airport can include a language spoken by the user, the type of luggage the user is carrying, and the placement of the virtual assistant kiosk 104 next to a food court.

In some implementations, a particular conversational goal model is selected for the encounter request based on one or more user contextual clues (302). In the example of the user 116 in the international terminal of the airport, the particular conversational goal model can be selected that includes a conversational goal of finding food for English-speaking users.

Based on the conversational goal model 126, a first encounter is selected (304). Continuing with the example of the user in the international terminal of the airport, the first encounter can include a holographic representation 122 of a map of the nearby restaurant options and a first dialog output asking the user for a type of food they are interested in eating.

A first user reaction is received responsive to the first encounter (306) including one or more user contextual clues. The first user reaction can include a first user dialog input and a first user engagement input. The first user reaction can include one or more contextual clues, for example, verbal and/or non-verbal cues. A non-verbal cue can include, for example, a gesture, a mood expression, and/or information related to the user's demographic. In the example of the user 116 in the international terminal of the airport, a non-verbal cue can be a user 116 stepping forward towards the virtual assistant kiosk 104, e.g., indicating interest in conversing with the virtual assistant system 102. In another example, a non-verbal cue can be a user 116 pointing in a particular direction, e.g., querying for information about a location in the particular direction.

In some implementations, an object 134 can be detected in the encounter area 118. A conversational goal model including a conversation goal can be selected (e.g., by the encounter selection module 110) based in part on the object 134 in the encounter area 118. For example, the virtual assistant system 102 can detect a shopping bag 140 in encounter area 142, as depicted in FIG. 1B, and determine that a conversational goal is to assist the user 138 in finding an item for purchase. In another example, an object 134 can be a suitcase in the encounter area 118, where a conversational goal may be to find ticketing at an airport.

The particular conversational goal model 126 is trained for the user 116 using the first encounter and the first user reaction, including the one or more user contextual clues (308). The particular conversational goal model 126 can be trained using user feedback from the encounter between the user 116 and the virtual assistant system 102 to create a personalized conversational goal model 126 for the user 116. For example, the virtual assistant system 102 may train a conversational goal model 126 that a user 116 wearing a business suit in an airport terminal is interested in finding a nearest coffee vendor. The particular conversational goal model 126 can be applied in a subsequent encounter between the user 116 and the virtual assistant system 102, or any user 116 having similar contextual clues. For example, a particular conversational goal model 126 can be "recommendations for purchasing shoes for a middle-aged woman" and can be applied to an encounter by the virtual assistant system 102 for a second encounter between a same user 138 and the virtual assistant system 102.

In some implementations, the particular conversational goal model 126 that has been trained using one or more encounters with users 116 can be applied to a subsequent encounter between a user 116 that is determined to have contextual clues 128 that correspond to the particular or site-specific conversational goal model 126. In one example, a particular conversational goal model 126 that has been trained using one or more encounters with traveling businessmen in an airport terminal can be selected, e.g., by the encounter interpretation module 108, using contextual clues 128 for a new user 116.

In some implementations, a conversational goal model 126 is trained for a specific interval of time using unsupervised training. For example, a conversational goal model 126 may be trained for a period of a week. In some implementations, a conversational goal model 126 is trained for a specific number of encounters between a user 116 and the virtual assistant system 102.

In some implementations, a virtual assistant kiosk 104 can collect data related to user gender, age, mood, and other user-information over a period of time to assist with data analytics for a business using the virtual assistant kiosk 104. Pattern analysis and other data analytics can be performed on the collected data to provide further service enhancement to users frequenting the business.

In some embodiments, a virtual assistant kiosk 104 can include medical device sensors, e.g., heart rate monitors, blood pressure, infrared cameras, etc., to provide diagnostic assessment of a user 116 that is interacting with the virtual assistant kiosk 104.

In some embodiments, a virtual assistant kiosk 104 can be a wine assistant that helps a user select a wine according to, for example, the user's tastes and needs. In one example, a wine assistant virtual kiosk can begin an interaction with a user by introducing itself as a wine expert and queries the user about menu options, upcoming occasions for the purchase of wine, or the like. The wine assistant virtual kiosk can verify an availability of a requested wine and/or wines it determines to suggest for purchase to the user, e.g., by checking an availability of the wine in a store inventory or a vending system inventory. Based on a selected recommendation and availability of the recommended wine, the wine assistant virtual kiosk may provide the recommendation including a holographic image of the wine and/or other details, e.g., a history of the vintage, place of origin, recommended pairing, pricing, etc., to the user. The wine assistant virtual kiosk may then provide directions including displaying a holographic map to indicate a location of the recommended bottle on a shelf within a store.

In some implementations the wine assistant virtual kiosk can include a vending machine system for the products recommended, such that it can dispense a selected wine bottle based on a user interaction with the wine assistant virtual kiosk.

Figure 4:
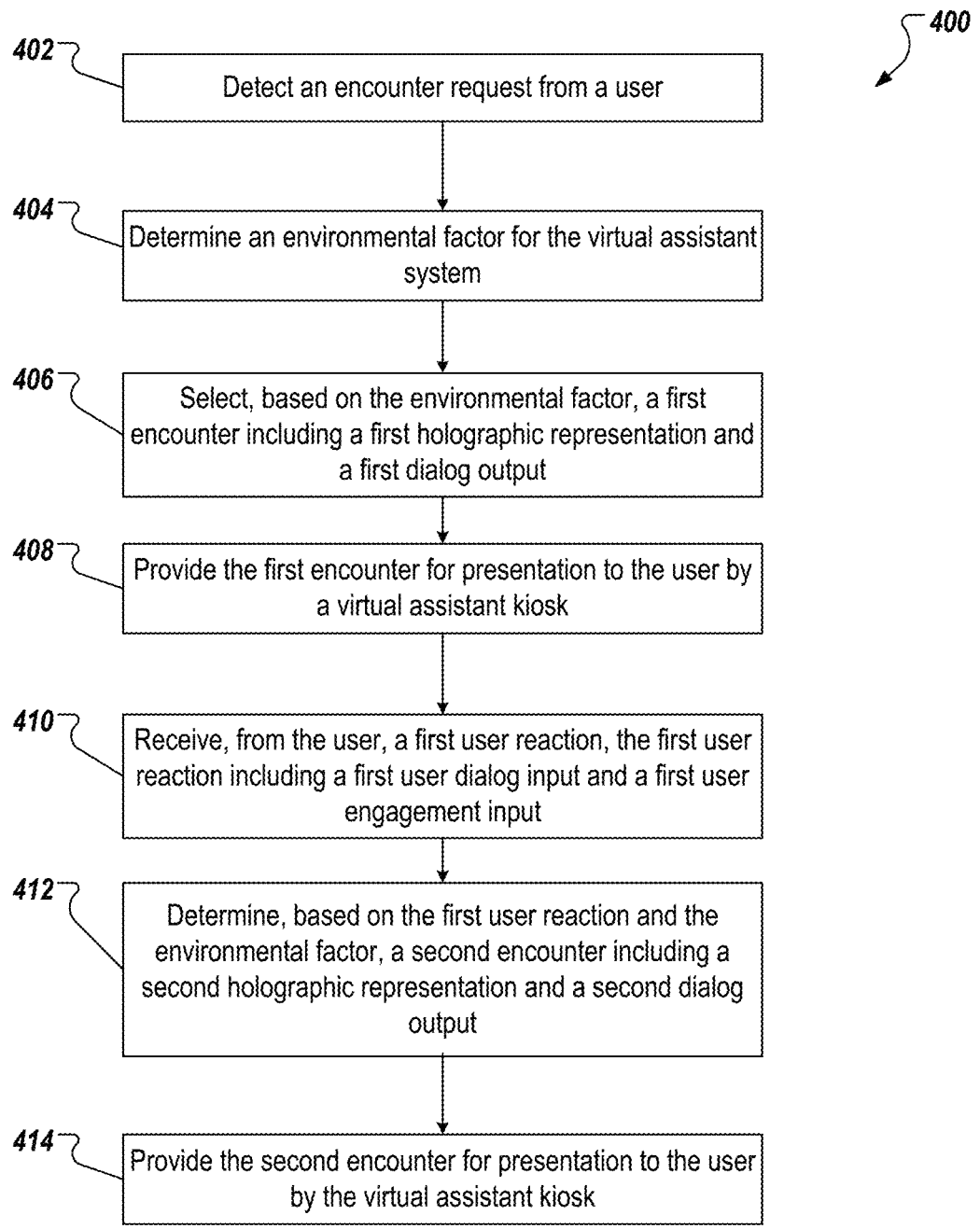
FIG. 4 is a flow diagram of another example process for operation of a virtual assistant system.

FIG. 4 is a flow diagram of another example process 400 for operation of a virtual assistant system. An encounter request is detected from a user (402). In the example operating environment 100 of the virtual assistant system 102 depicted in FIG. 1A, a user 116 with a suitcase 134 enters the encounter area 118. An encounter request (e.g., the user 116 and the user's suitcase 134 enter into the encounter area 118) can be detected by the encounter detector 106 using data collected from sensors 114. As described in further detail with reference to step 202 of FIG. 2, the encounter request is an initiation of a dialog process between the user 116 and the virtual assistant system 102. For example, a user pointing in a direction down a terminal at an airport and asking "is my flight departing from a gate down that way?"

An encounter interpretation module 108 receives the encounter request from the user 116 and determines an environmental factor for the virtual assistant system 102 (404). Environmental factors can include information related to the orientation and/or position of the user 116 relative to the virtual assistant kiosk 104 and a location of the virtual assistant kiosk 104 relative to its environment. For example, an environmental factor can be the position of the virtual assistant kiosk 104 at a departure gate inside an airport terminal. In another example, an environmental factor can be that the user 116 is standing to the right of the virtual assistant kiosk 104.

In some implementations, the contextual knowledge base 128 includes maps of a geographic area of interest to the virtual assistant kiosk 104, where a map can include information about locations of interest in an area near the virtual assistant kiosk 104. For example, a virtual assistant kiosk 104 located in an airport terminal can access a map of the airport terminal from the contextual knowledge base 128 including locations of the gates, restaurants, bathrooms, shops, etc. In another example, a virtual assistant kiosk 104 located in a museum can access a map of the museum from the contextual knowledge base 128 including locations of different exhibits, particular works of art, a museum cafeteria, bathrooms, gift shop, etc.

A map and other location information accessible to the virtual assistant system 102 in the contextual knowledge base 128 can be used by the virtual assistant system 102 to interpret the encounter request. For example, a user 116 initiating an encounter request at a virtual assistant kiosk 104 in or near a women's clothing store is likely interested in assistance purchasing an article of women's clothing. In another example, a user initiating an encounter request by asking "where is the bathroom" is likely interested in a nearest bathroom to the virtual assistant kiosk 104 receiving the encounter request.

A first encounter is selected based on the environmental factor, including a first holographic representation 122 and a first dialog output (406). In one example, an environmental factor is a location of the virtual assistant kiosk 104 next to a food court at a shopping center. A first encounter can include a map holographic representation depicting the food court and a first dialog output solicits a type of food that the user 116 may want to eat, e.g., "What kind of food are you looking for?". In another example, an environmental factor is a location of a user 116 relative to the virtual assistant kiosk 104, where the user 116 such that a first holographic representation 122 is a face/head avatar which is oriented such the face of the avatar is pointing at the user, e.g., the avatar is "looking" directly at the user 116.

As described in further detail above with reference to FIG. 2, the selection of the first holographic representation 122 can depend on the selected first dialog output and vice versa. For example, the first holographic representation can be a human head/face avatar that is animated such that it appears to speak the first dialog output.

In some implementations, an orientation of the user 116 relative to the virtual assistant kiosk 104 changes during the encounter, e.g., the user 116 shifts around the encounter area 118. The encounter interpretation module 108 can track a relative position of the user 116 to the virtual assistant kiosk 104 and update the environmental factor accordingly, e.g., track the user moving from in front of the kiosk to one side of the kiosk. The updated environmental factor can be used to select a holographic representation 122. In one example, the updated position of the user 116 relative to the virtual assistant kiosk 104 can cause the face/head avatar holographic representation to "turn" such that the face of the face/head holographic representation continues to be positioned towards the user 116.

In some implementations, the first encounter can be selected in part based on a conversational goal model 126 that is selected for the encounter between the virtual assistant system 102 and the user 116. An environmental factor may affect the selection of the conversational goal model 126. For example, a virtual assistant kiosk 104 located at a baggage claim of an airport may select a conversational goal model 126 for a user 116 that provides ground transportation information.

The first encounter is provided for presentation to the user 116 on the virtual assistant kiosk 104 (408). Presentation of the first encounter can be a relaying of a piece of information to the user 116, querying the user 116 for input, or a combination thereof. The presentation of the first encounter is displayed for viewing by the user 116 in the virtual assistant kiosk 104 and can include an animation of the first holographic representation 122. For example, the animation can be a human head/face avatar holographic representation 122 speaking the first dialog output. In another example, the animation can be a map holographic representation 122 where a route to a location of interest is indicated.

A first user reaction from the user 116 is received, where the first user reaction includes a first user dialog input and a first user engagement input (410). As described above with reference to FIG. 2, the first user reaction can be determined from data collected by the one or more sensors 114, e.g., video camera, microphone, etc.

A user engagement input is a non-verbal communication by the user 116 to the virtual assistant system 102, where the user 116 is relaying information to the virtual assistant system 102. Non-verbal communication can be determined from data collected by the sensors 114 and processed, for example, using machine-learning and/or software analytics to perform facial recognition, gesture recognition, and/or mood recognition. In one example, user 116 is in a terminal of an airport, and a non-verbal cue is the user 116 stepping forward towards the virtual assistant kiosk 104, e.g., indicating interest in conversing with the virtual assistant system 102. In another example, a non-verbal cue can be a user 116 pointing in a particular direction, e.g., querying for information about a location in the particular direction.

In some implementations, a specialized neural network (DNN) is used to analyze each type of non-verbal communication, e.g., one DNN for facial recognition, another DNN for gesture recognition, another DNN for mood recognition. A meta neural network can combine results for each one of the specialized DNN into the final decision-making process.

A first user engagement input can be interpreted based on the environmental factor. A first user engagement that is a gesture can be interpreted by the virtual assistant system 102 based in part on contextual clues, for example, where the virtual assistant kiosk 104 and the user 116 are relative to a location and relative to each other. For example, a user 116 gesturing to the right of the virtual assistant kiosk 104 can be interpreted by the virtual assistant system 102 as the user indicating interest in an object or location that is located in a vicinity that is to the right of the virtual assistant kiosk 104. The virtual assistant system 102 may access one or more maps of an area surrounding the virtual assistant kiosk 104 from the contextual knowledge base 128 to determine where the virtual assistant kiosk 104 is located and determine what the user 116 may be identifying through the user gesture.

In some implementations, a user 116 can communicate an activity of interest, e.g., mime a drink of water, eating food, in the first user engagement input. The virtual assistant system 102 can interpret the first user engagement input and access a map including nearby locations for the activity of interest, e.g., a map of local bars near the virtual assistant kiosk 104.

Based on the first user reaction and the environmental factor, a second encounter is selected, where the second encounter includes a second holographic representation and a second dialog output (412). The second encounter can be selected, in part, based on the first user reaction and the environmental factor, or by the first user reaction alone. The second encounter can answer a question posed by the user 116 in the first user reaction and provide additional information in response to a request for more information. For example, a first user reaction can include a question "where is the nearest bathroom?" The environmental factor can be a location of the virtual assistant kiosk 104 relative to a nearest bathroom facility, and a second encounter can be a holographic representation 122 of a map animated to indicate a location of the nearby bathroom or a holographic representation of a gesturing hand/arrow pointing in the direction of the nearby bathroom.

In another example, a first user reaction can include a question "is the shoe store that way?" and a user gesture indicating a particular direction. The environmental factor can be a location of the virtual assistant kiosk 104 relative to the store of interest and a location of the user 116 relative to the virtual assistant kiosk 104 (e.g., to interpret which direction the user 116 is pointing). The second encounter can be a holographic representation 122 of a map animated to indicate a location of the store of interest, a face/head avatar animated to respond "yes" or "no" in response to the user's question, or a pointing arrow/hand in the direction of the store of interest. A second encounter can be a holographic representation indicating a location of an item of interest in the store/shop, display an indication of availability in the shop or store, or display a notification that a "human sales assistant" has been summoned for support if previously requested information was not available.

In some implementations, the second holographic representation 122 can be of a same type as the first holographic representation 122 but is animated to provide a different dialog in the second dialog output. For example, a face/head avatar holographic representation can be the first and second holographic representation 122, where the face/head holographic representation 122 is animated to provide a first dialog output in a first encounter and is animated to provide a second dialog output in a second encounter.

The second holographic representation may be altered relative to the first holographic representation based on the environmental factor. In one example, the environmental factor is the user 116 moving relative to the virtual assistant kiosk 104 within the encounter area 118. The first holographic representation and second holographic representation are both a face/head avatar where each is positioned to be facing the user 116, e.g., follows the user's movements within the encounter area 118.

In some implementations, the second holographic representation 122 can be a different type of holographic representation 122, where the different holographic representation 122 is selected based on, for example, a user 116 requesting directions. For example, a face/head avatar holographic representation can be the first holographic representation, where the face/head holographic representation is animated to provide a first dialog output, e.g., "What are you looking for today?" in a first encounter and a map holographic representation can be the second holographic representation, where the map indicates a particular location while an audible dialog is provided, e.g., "The bathrooms are to your left".

The second encounter is provided for presentation to the user 116 on the virtual assistant kiosk 104 (414). As described with reference to FIG. 2, presentation of the second encounter can be a relaying of a piece of information to the user 116, querying the user 116 for input, or the like.

Figure 5:
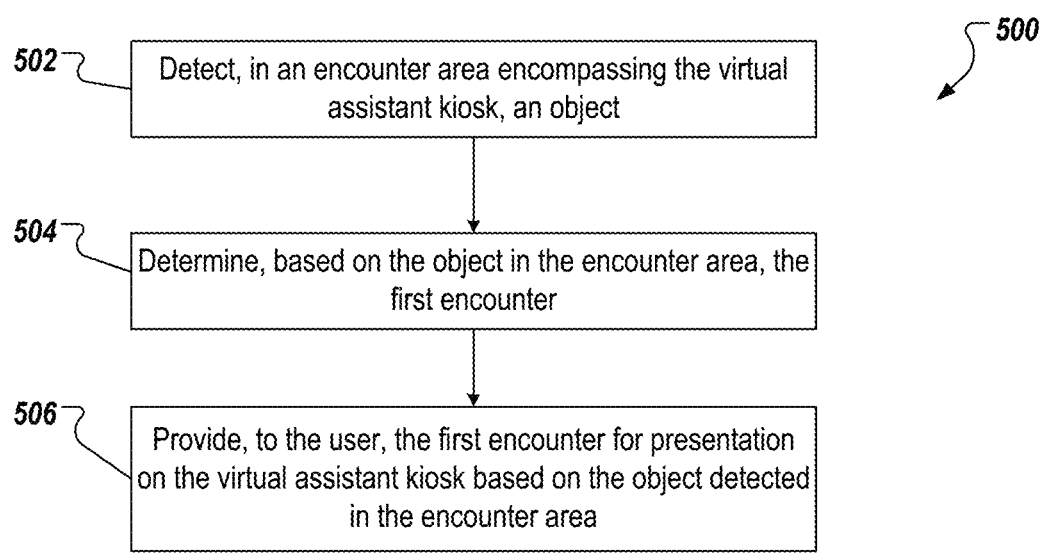
FIG. 5 is a flow diagram of another example process for operation of the virtual assistant system.

FIG. 5 is a flow diagram of another example process 500 for operation of the virtual assistant system 102. An object 134 is detected in the encounter area 118 encompassing the virtual assistant kiosk 104 and including the user 116 (502). For example, the virtual assistant system 102 can detect a shopping bag 140 in encounter area 142, as depicted in FIG. 1B, and determine to assist the user 138 in finding an item for purchase. In another example, an object 134 can be a suitcase in the encounter area 118, and the virtual assistant system 102 can determine to assist the user 116 to find ticketing at an airport.

In some implementations, one or more objects 134 are recognized by the encounter interpretation module 108 based in part on an environmental factor. For example, a bag object 134 may be identified using a conversational goal model 126 as a piece of luggage for a virtual assistant kiosk 104 that is deployed in an airport terminal. In another example, a bag object 134 may be identified as a shopping bag for a virtual assistant kiosk 104 that is deployed in a shopping mall.

Based on the object 134 in the encounter area 118, the first encounter is determined (504). The first encounter is selected to include a first holographic representation 122 and a first dialog output, where each of the first holographic representation 122 and the first dialog output are selected, in part, based on the object 134 that is detected in the encounter area 118. For example, the virtual assistant system 102 determines that a user 116 carrying a piece of luggage 134 may be interested in information related to flight departures, locations of restaurants in the terminal, or directions to baggage claim at the airport. A first encounter can include a first dialog output "Can I help you find your connecting flight?" and a first holographic representation can be a face/head avatar or a map of the terminal. In another example, an object may be a shoe that a user 116 has picked up from a display case at a store. A first encounter can include a first dialog output "What size are you looking for in that shoe?" and a first holographic representation can be a face/head avatar or a three-dimensional holographic representation of the particular shoe.

The first encounter is provided to the user 116 for presentation on the virtual assistant kiosk 104 based on the object 134 detected in the encounter area 118 (506). The first holographic representation 122 can be presented by a holographic projector on the virtual assistant kiosk 104 and the first dialog output is provided through speakers of the virtual assistant kiosk 104. For example, a first encounter including a face/head avatar can be presented in the virtual assistant kiosk and animated to speak the first dialog output that is audible through speakers 124 of the virtual assistant kiosk 104.

In some implementations, user interactions can be logged and collected from multiple holographic assistants to understand basic key performance indicators (KPIs), e.g., traffic at particular holographic assistants at specific locations. Data from multiple holographic assistants can be used to identify patterns on dialogue requests, environment factors, and the like. Detection of patterns and other analysis can be performed and can be utilized to further train the models for the dialogue knowledge base and the contextual knowledge base, as well as the optimization of the conversational goals.

In some implementations, a virtual holographic assistant can incorporate a scanned portion of the user interacting with the virtual holographic assistant. In one example, the holographic assistant at a retail store can scan a foot of the user and superimpose a shoe for sale over the scanned foot to indicate fit and style. In another example, the holographic assistant at a eyeglass store can scan a face of the user and superimpose various styles of frames to show style and fit.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Figure 6:
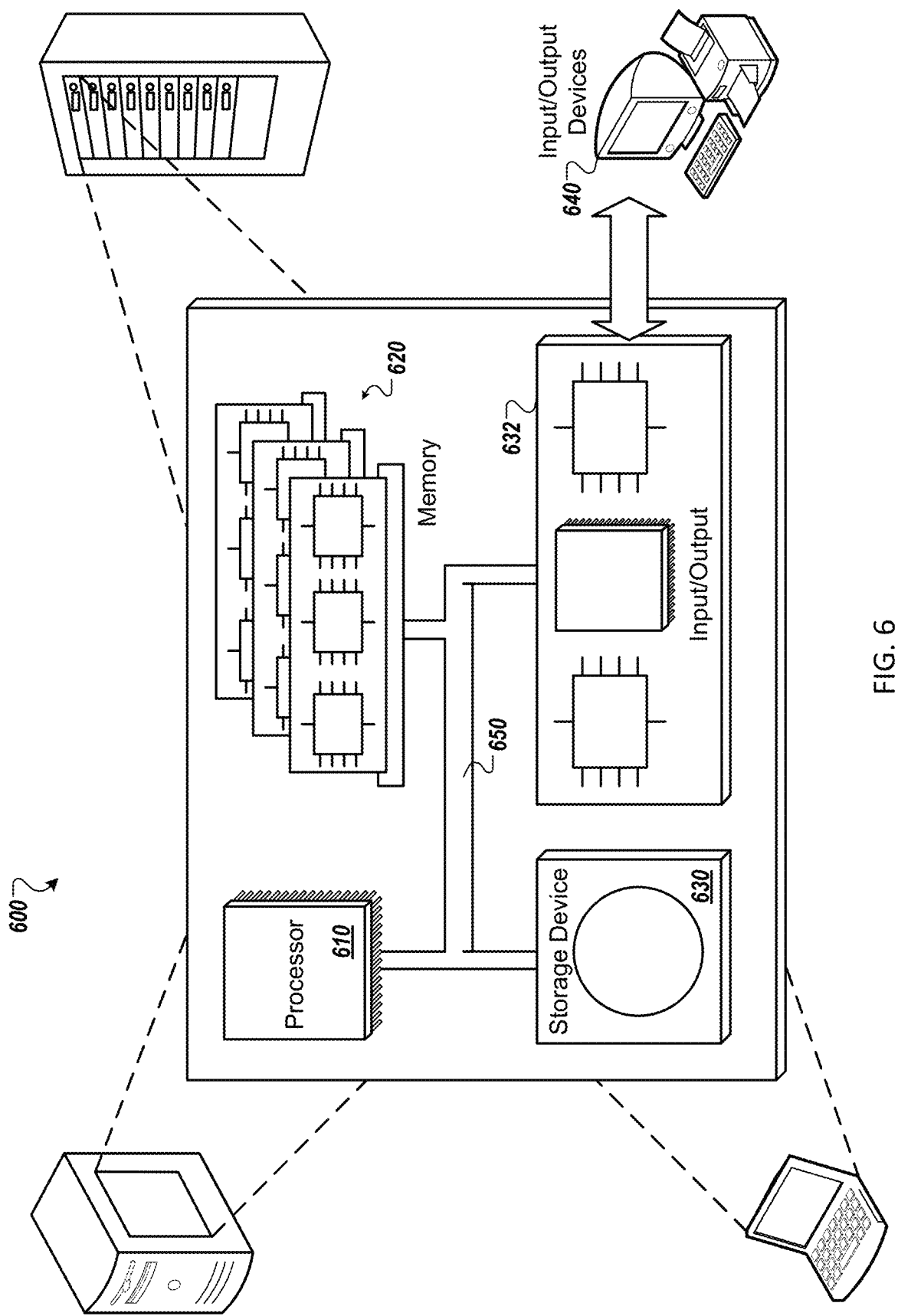
FIG. 6 is a diagram of an example computing system that may perform one or more of the disclosed computer-implemented processes.

An example of one such type of computer is shown in FIG. 6, which shows a schematic diagram of a generic computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output module 632 includes hardware or hardware and software for interfacing system 600 with the input/output device 640 or other devices or interfaces.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing an enhanced encounter via a holographic virtual assistant, the method being executed by one or more processors and comprising:
    detecting, by the one or more processors, an encounter request from a user;
    determining, by the one or more processors, one or more present ambient conditions comprising (A) a current crowd level or (B) a current interior lighting scheme of a physical operating environment in which a holographic virtual assistant kiosk that houses the holographic virtual assistant is located, the present ambient conditions being conditions that (i) change over time, and (ii) are unrelated to the user associated with the encounter request;

selecting, by the one or more processors and based on the one or more present ambient conditions and the encounter request, a first encounter that includes a first holographic representation and a first dialog output, including at least one of:
selecting a first holographic representation based on the current interior lighting scheme; or
selecting a length of a first dialog output based on the current crowd level; and
providing, by the one or more processors, the first encounter for presentation to the user on a holographic virtual assistant kiosk.

2. The method of claim 1, wherein the first dialog output includes a volume parameter that is selected based on a current interior noise level.

3. The method of claim 1, wherein the first encounter is selected further based on a current location, availability or inventory of a particular product that is sold in the physical operating environment in which the holographic virtual assistant kiosk is located.

4. The method of claim 1, wherein the first encounter is selected further based on a current weather near where the holographic virtual assistant kiosk is located.

5. The method of claim 1, wherein the encounter request indicates a side of the holographic virtual assistant kiosk where the user is standing.

6. The method of claim 1, wherein the encounter request includes a gesture of the user.

7. The method of claim 1, comprising determining an angle that reflects where the user is standing in relation to a front of the holographic virtual assistant kiosk, and wherein the first holographic representation is selected further based on the angle.

8. One or more non-transitory computer-readable storage media coupled to one or more processors and having instructions stored thereon which, when executed by one or more processors, cause the one or more processors to perform operations for providing an enhanced encounter via a holographic virtual assistant, the operations comprising:
detecting, by the one or more processors, an encounter request from a user;
determining, by the one or more processors, one or more present ambient conditions comprising (A) a current crowd level or (B) a current interior lighting scheme of a physical operating environment in which a holographic virtual assistant kiosk that houses the holographic virtual assistant is located, the present ambient conditions being conditions that (i) change over time, and (ii) are unrelated to the user associated with the encounter request;
selecting, by the one or more processors and based on the one or more present ambient conditions and the encounter request, a first encounter that includes a first holographic representation and a first dialog output, including at least one of:
selecting a first holographic representation based on the current interior lighting scheme; or
selecting a length of a first dialog output based on the current crowd level; and
providing, by the one or more processors, the first encounter for presentation to the user on a holographic virtual assistant kiosk.

9. The media of claim 8, wherein the first dialog output includes a volume parameter that is selected based on a current interior noise level.

10. The media of claim 8, wherein the first encounter is selected further based on a current location, availability or inventory of a particular product that is sold in the physical operating environment in which the holographic virtual assistant kiosk is located.

11. The media of claim 8, wherein the first encounter is selected further based on a current weather near where the holographic virtual assistant kiosk is located.

12. The media of claim 8, wherein the encounter request indicates a side of the holographic virtual assistant kiosk where the user is standing.

13. The media of claim 8, wherein the encounter request includes a gesture of the user.

14. The media of claim 8, wherein the operations comprise determining an angle that reflects where the user is standing in relation to a front of the holographic virtual assistant kiosk, and wherein the first holographic representation is selected further based on the angle.

15. A system comprising
one or more processors; and
a computer-readable storage device coupled to the one or more processors and having instructions stored thereon which, when executed by the one or more processors, cause the one or more processors to perform operations for providing an enhanced encounter via a holographic virtual assistant, the operations comprising:
detecting, by the one or more processors, an encounter request from a user;
determining, by the one or more processors, one or more present ambient conditions comprising (A) a current crowd level or (B) a current interior lighting scheme of a physical operating environment in which a holographic virtual assistant kiosk that houses the holographic virtual assistant is located, the present ambient conditions being conditions that (i) change over time, and (ii) are unrelated to the user associated with the encounter request;
selecting, by the one or more processors and based on the one or more present ambient conditions and the encounter request, a first encounter that includes a first holographic representation and a first dialog output, including at least one of:
selecting a first holographic representation based on the current interior lighting scheme; or
selecting a length of a first dialog output based on the current crowd level; and
providing, by the one or more processors, the first encounter for presentation to the user on a holographic virtual assistant kiosk.

16. The system of claim 15, wherein the first dialog output includes a volume parameter that is selected based on a current interior noise level.

17. The system of claim 15, wherein the first encounter is selected further based on a current location, availability or inventory of a particular product that is sold in the physical operating environment in which the holographic virtual assistant kiosk is located.

18. The system of claim 15, wherein the first encounter is selected further based on a current weather near where the holographic virtual assistant kiosk is located.

19. The system of claim 15, wherein the encounter request indicates a side of the holographic virtual assistant kiosk where the user is standing.

20. The system of claim 15, wherein the encounter request includes a gesture of the user.

\* \* \* \* \*